(12) United States Patent
Kesarwani et al.

(10) Patent No.: US 7,213,258 B1
(45) Date of Patent: May 1, 2007

(54) SYSTEM AND METHOD FOR MANAGING AND CONTROLLING DATA

(75) Inventors: Amit Kesarwani, Smyrna, GA (US); Amy Rich Warner, Marietta, GA (US)

(73) Assignee: BellSouth Intellectual Property Corp., Wilmington, DE (US)

( * ) Notice: Subject to any disclaimer, the term of this patent is extended or adjusted under 35 U.S.C. 154(b) by 0 days.

(21) Appl. No.: 09/468,083

(22) Filed: Dec. 21, 1999

Related U.S. Application Data

(60) Provisional application No. 60/141,266, filed on Jun. 30, 1999.

(51) Int. Cl.
*G06F 7/22* (2006.01)

(52) U.S. Cl. .............................. 726/3; 705/42

(58) Field of Classification Search ............... 707/10; 713/202; 709/236, 246; 705/42; 726/3
See application file for complete search history.

(56) References Cited

U.S. PATENT DOCUMENTS

| | | | | |
|---|---|---|---|---|
| 5,025,373 A | * | 6/1991 | Keyser et al. ................ 705/42 |
| 5,345,586 A | * | 9/1994 | Hamala et al. ............... 707/10 |
| 5,553,304 A | * | 9/1996 | Lipner et al. ............ 707/104.1 |
| 5,692,157 A | * | 11/1997 | Williams .................... 709/246 |
| 5,758,150 A | * | 5/1998 | Bell et al. ..................... 707/10 |
| 5,826,268 A | * | 10/1998 | Schaefer et al. ............... 707/9 |
| 5,848,415 A | * | 12/1998 | Guck ........................... 707/10 |
| 5,899,991 A | * | 5/1999 | Karch ........................... 707/5 |
| 5,924,077 A | * | 7/1999 | Beach et al. .................. 705/10 |
| 5,944,825 A | * | 8/1999 | Bellemore et al. .......... 713/202 |
| 5,994,825 A | * | 11/1999 | Goto et al. ............. 313/318.07 |
| 5,999,973 A | * | 12/1999 | Glitho et al. ................ 709/223 |
| 6,029,160 A | * | 2/2000 | Cabrera et al. ................ 707/1 |
| 6,356,909 B1 | * | 3/2002 | Spencer ....................... 707/10 |
| 2001/0011349 A1 | * | 8/2001 | Garrison ..................... 713/165 |

\* cited by examiner

*Primary Examiner*—Kambiz Zand
*Assistant Examiner*—Andrew L. Nalven
(74) *Attorney, Agent, or Firm*—Withers & Keys, LLC

(57) ABSTRACT

A system for managing and controlling data. The system includes provisions for easily and rapidly updating and managing a computer system, particularly a complex computer system in which several computers communicate with one another. The system also includes a central database which plays a key role in the management and control of the computer system. Most of the management functions are retained in the central database and remote offices, which generally do not retain data management information, communicate with the central office to retrieve data management information. The system also includes a novel approach to manipulating data.

9 Claims, 6 Drawing Sheets

SYSTEM AND METHOD FOR MANAGING AND CONTROLLING DATA

The present application claims priority from the filing date of the provisional patent application Ser. No. 60/141,266 filed Jun. 30, 1999, entitled "SYSTEM AND METHOD FOR MANAGING AND CONTROLLING DATA".

BACKGROUND

1. Field of the Invention

The present invention is directed to a system and method for collecting, processing, controlling and updating data from a variety of sources. More particularly, the invention relates to simplifying the management and control of such data.

2. Background of the Invention

In the past when multiple business entities needed to communicate with a single central business entity, for example when multiple overseas affiliates of a large multi-national corporation needed to communicate with a home office, a computer system such as the system shown in FIG. 1 was generally employed. A first remote office 102 would generally include at least one data entry operator 104 and at least one computer operator 106. The data entry operator 104 would generally enter information into a computer system at the remote office 102. The computer operator 106 at the first remote office would maintain, update, and manage the computer system at the first remote office 102.

A similar approach would be followed in a second remote office 108. Like the first remote office 102, the second remote office 108 would include a data entry operator 110 and a computer operator 112. The tasks of the second 110 data entry operator and the second computer operator 112 would be similar to those of the first data entry operator 104 and the first computer operator 106. The second remote office 108 would also communicate with the main office 126. There could be a number N of remote offices 114 which would each have a data entry operator 116 and a computer operator 118. All of the remote offices 102, 108 and 114 would communicate with the main office 140.

Often the remote offices would run different computer platforms, different software, and would produce different outputs. In other words, each of the remote offices 102, 108, and 114 would produce data in local formats and there would not be uniformity in the data outputs from the remote offices. All of the outputs from the remote offices 102, 108, and 114 would eventually be sent to the main office 140.

Generally, the computer system 120 in the main office 140 would interface with the remote offices, receive data from the remote offices, and print the outputs from the remote offices via a printer 122. The term "computer system" as used throughout the specification and claims means use of a portion of computer resources of a computer, a single computer, or a computer in communication with other computers, unless expressly stated otherwise. A person 124 (or a team of persons) would read and analyze the outputs from the remote offices. Because the remote offices would produce data in different formats, the conversion team 124 would have to convert the data to a format compatible with the main office data base. In other words, the conversion team 124 would have to select and reformat the data, convert the outputs, and enter the converted data into data base 126. This could be a manual step in the process.

After the data was collected and converted and entered into the main database 126, reports 128 could be generated. Many problems and inefficiencies occur to the extent that the remote offices use different data rules and access rules than each other and than the main office 140.

Data rules, as used throughout the specification and claims, unless expressly stated otherwise, means any rule governing any data parameter or format. For example, data rules would include such things as number and organization of fields, field types, syntax, size of field, and any other data structure requirements or protocols.

Access rules, as used throughout the specification and claims, unless expressly stated otherwise, means any rule governing the transmission or reception of any data from one entity to any other entity. An entity can be a natural person, a computer system, or an office. Access rules would include rules governing, for example, login identifications, passwords, security levels or hierarchy, access codes, rights to documents and allocation of memory.

Prior art system 100 would also have difficulty in managing and controlling data and access. Because the access rules and data rules are usually maintained or stored locally within the remote offices, it could be very difficult to manage and control data and access from main office 140. In order to update an access rule or a data rule, the main office 140 has to correspond or communicate with the remote office which is affected by the change in access or data rule. For example, if a certain field were to be expanded from 5 digits to 7 digits, the main office 140 would have to correspond with each of the remote offices and inform them that this field has been expanded from 5 to 7 digits. A computer operator 106 in the first remote office 102 would have to review the correspondence, and update the remote office computer system accordingly. Likewise, computer operator 112 in the second office 108 would also have to review the correspondence and update the computer system in the second remote office 108. This would continue until the Nth computer operator 318 would review the same correspondence and update the computer system in the Nth remote office 114. Unfortunately, not all remote offices have a computer operator, so for those offices that do not have a computer operator, necessary changes in the computer system of that remote office might not be made and inconsistent data could be transmitted back to the main office 140. Moreover, if one of the computer operators were to make an error, inconsistent data could be transmitted to the main office 140. Another computer operator 130 at the main office 140 would have to update the computer system of the main office 140.

If the prior art system included remote offices located in foreign countries, additional problems could arise. The accounting practices and accounting rules in those foreign countries would generally vary from country to country, further complicating the interface between the main office and the remote offices. The different accounting procedures would also make it difficult to implement universal data rules across all remote offices. Currency fluctuations between the countries would also further complicate data exchange and integration between the remote offices and the main office.

The prior art system would generally use conventional data base computing structures such as the structures shown in FIG. 2. For example, as shown in FIG. 2, if an operation was required for two data elements A and B, the conventional computer system would perform the following steps. In step 200, the computer would select element A from the data base. In step 202, the computer would select element B from the data base. In step 204, the computer would recall an embedded command and manipulate A and B accordingly. In step 204, A and B could be added, subtracted, multiplied, divided, added to another number, or multiplied by another number, i.e., basically any mathematical operation or other manipulation that could be executed using data elements A and B. In step 206, the result would be stored as output C. The resulting data base would have three locations A, B and C. The embedded command in step 204 could be either embedded in the software or contained as a data base field where field A and field B are added to created field C.

The prior art computing structures that use embedded commands or functions have several drawbacks. The embedded commands are difficult to update or edit. This problem becomes magnified if there are several offices that all have an embedded command and all of the embedded commands in all of those offices need to be simultaneously updated. In these cases, a computer operator in each office would have to manually gain access to the embedded command, and then carefully update and edit the embedded command. This process is slow and is prone to human error due to the demanding nature of the modifications that must be made by a computer operator.

SUMMARY OF THE INVENTION

The present invention is a system and method for managing and controlling data from a main office. Instead of each of the remote offices maintaining their own versions of access rules and data rules, the invention retains all of the access rules and data rules in the main office. In the present invention, when a remote office has to transmit data to the main office, the remote office first downloads the access rules and the data rules, thus assuring that the latest version will be used and also assuring that the transmitted data will be in a format expected by the main computer.

In addition to improving the coordination of data transfer, this also allows easy and rapid updating and managing of these rules. Unlike the prior art system that required a computer operator in each remote office, the present invention requires only a single computer operator in one location to handle all of the access rule and data rule maintenance for all of the remote offices. The present invention also includes a central database which plays a key role in the management and control of the computer system.

In the present invention, the system places mathematical functions, expressions, and operators used within the database that retains data instead of embedding the mathematical functions, expressions, and operators in a traditional analysis program, such as a spreadsheet. The functions, expressions and operators are stored with the data such that any generic program can simply read the data from the database in a predetermined pattern, which automatically enables the generic program to perform the desired operations and calculations.

Accordingly, the present invention is directed to a system and method for managing and controlling data that substantially obviates one or more of the problems due to the limitations and disadvantages of the related art.

An object of the present invention is to facilitate efficient maintenance of a computer system.

Another object of the present invention is to provide centralized control and maintenance of a computer system.

Another object of the present invention is to eliminate redundant tasks.

Another object of the present invention is to reduce the need for human intervention.

Another object of the invention is to provide a flexible system that is easy to expand in many different ways.

Another object of the invention is to provide a system that can dynamically create a web site.

Additional features and advantages of the invention well be set forth in the description which follows, and in part will be apparent from the description, or may be learned by practicing the invention. The objectives and other advantages of the invention will be realized and attained by the structure particularly pointed out in the written description and claims as well as the appended drawings.

DETAILED DESCRIPTION OF THE INVENTION

Figure 3:
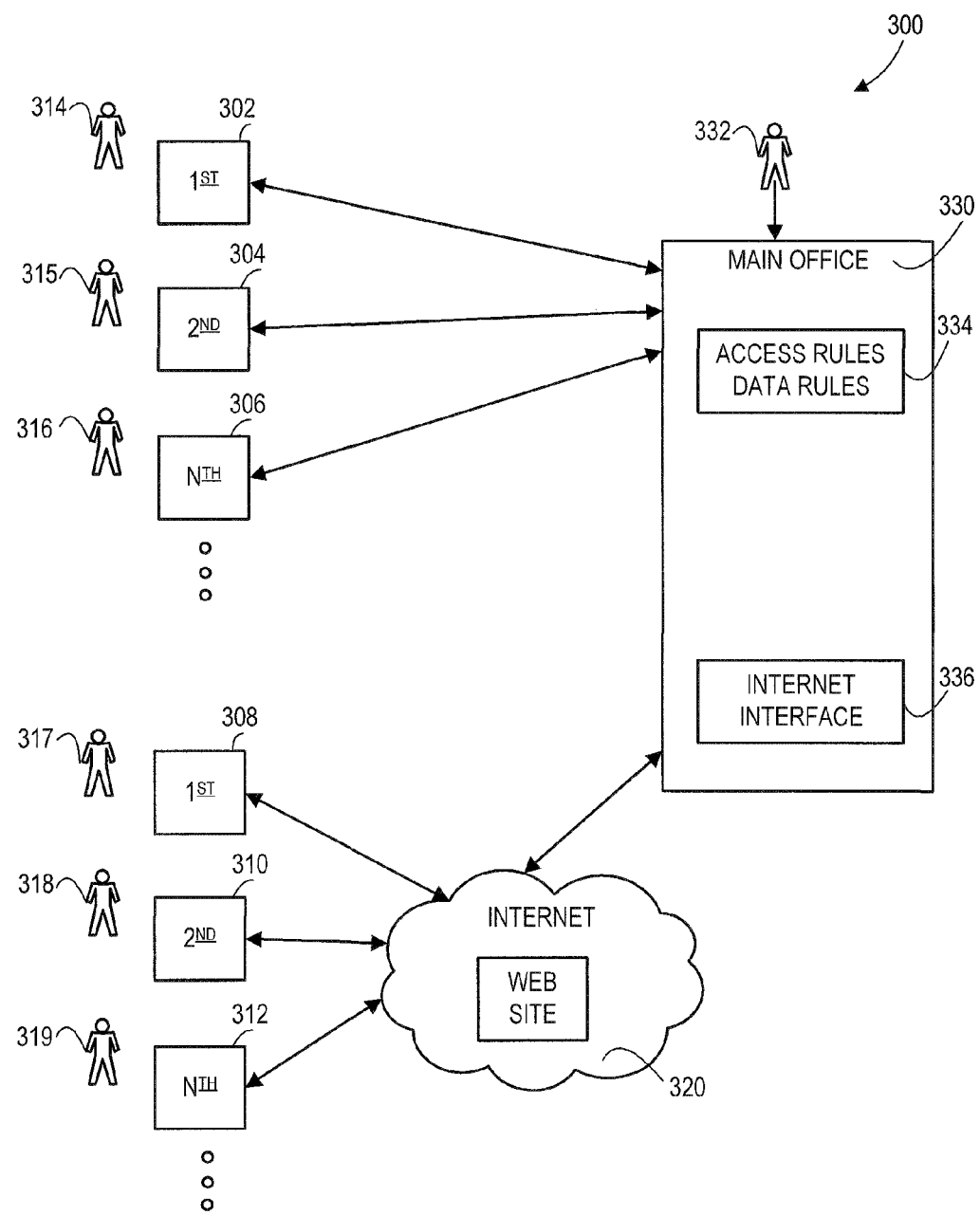
FIG. 3 is an overall schematic of an embodiment of the invention.

FIG. 3 is a schematic diagram of a preferred embodiment of a data management system 300. The system 300 can include directly linked offices and offices that communicate with the main office 330 over the internet. The linked offices can be linked by a wide area network, ethernet, intranet, conventional telephone line, or any other suitable communication system. Any number of remote offices, including just one remote office, can be directly connected to the main office 330. For illustrative purposes only, the embodiment shown in FIG. 3 includes a first remote office 302, a second remote office 304, and an Nth remote office 306, to represent any number of directly connected offices.

One or many other remote offices can communicate with the main office 330 over the internet 320. For illustrative purposes only, the embodiment shown in FIG. 3 includes a first indirectly connected remote office 308, a second indirectly connected remote office 310 and an Nth indirectly connected remote office 312. These three indirectly connected offices represent one or many indirectly connected offices that are contemplated by the present invention. Preferably, the indirectly connected offices communicate with the main office over the internet and via a secured website on the internet.

Unlike the prior art, management and control of the computer system is greatly simplified. One aspect of the invention which helps to simplify management control of the data base is the storage of access rules and data rules in the main data base, instead of in the remote offices. In the embodiment shown in FIG. 3, when a remote office (either directly connected or indirectly connected via the internet) wants to transmit information to the main office, the remote office receives access rules and data rules 334 maintained at the main office. As stated above, the access rules generally relate to rules established to control access to information contained at the main office. For example, access rules would include: security access codes, passwords, login ID's, and access information. For example, one access rule could be that a remote office can only read information about its own remote office that it has stored or sent to the main office, and it could not read information related to other remote offices. Another access rule could be that remote offices may only send information to the remote office but could never delete information at the main office.

Figure 1:
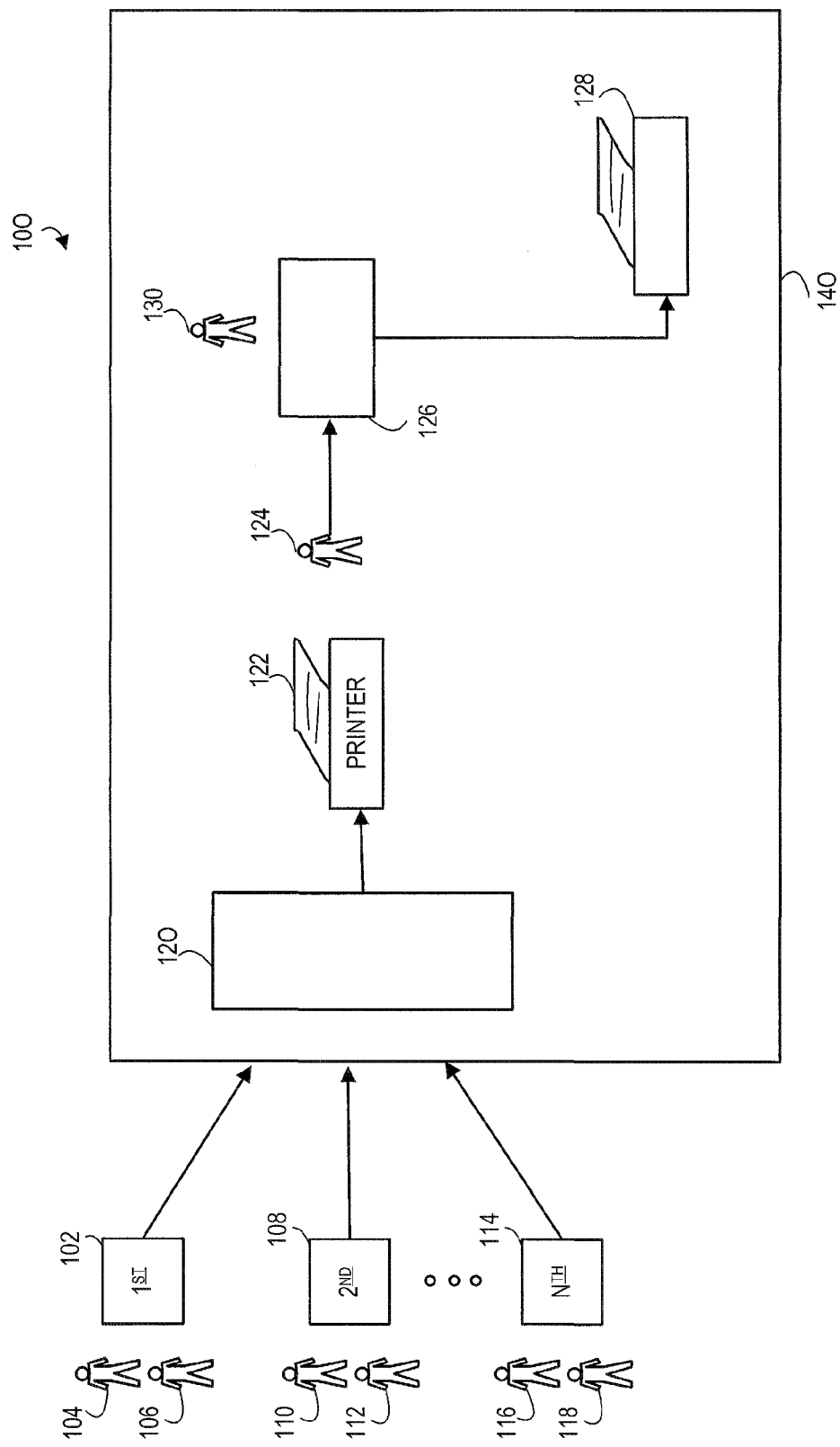
FIG. 1 is a prior art computer system.

Again, data rules specify how the data must be entered into the system and what the system expects the data format to look like. Both of these, the access rules and the data rules, would be received by the remote offices 302, 304, 306, 308, 310, and 312 before the remote offices send data to the main office. This allows all of the remote offices to correctly format their data and follow all the data rules dictated by the main office. This eliminates the need for a conversion team (124, see FIG. 1) because the data received from the remote offices would already be correctly formatted.

Another important advantage of this invention over the prior art is the ease of maintenance. Because all of the access rules and the data rules 334 are retained in the main office 330, only a single computer operator 332 is required to maintain and update the access rules and the data rules. This eliminates the need for a separate computer operator to be present in each remote office.

Figure 4:
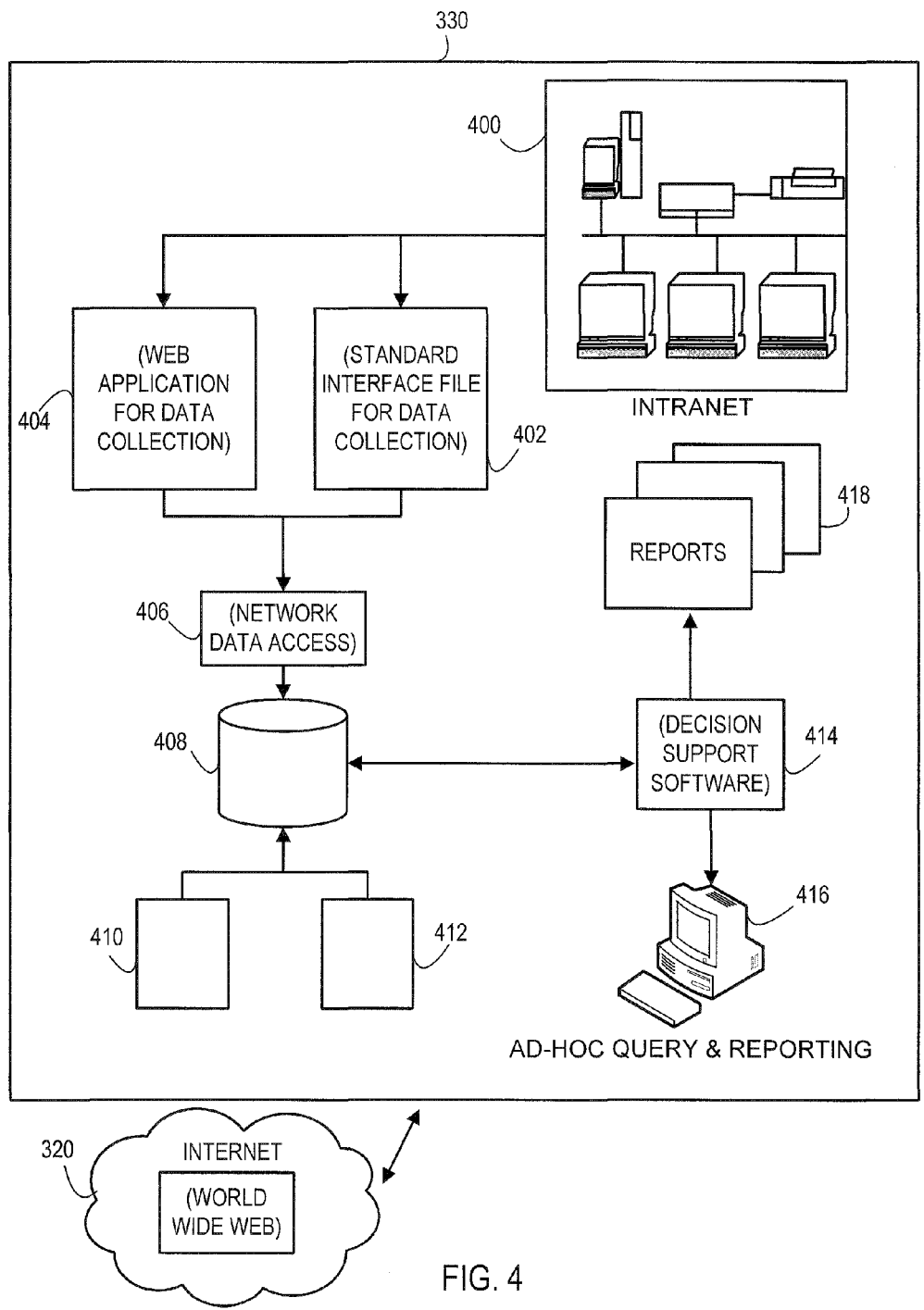
FIG. 4 is an enlarged view of a preferred embodiment of a main office according to the invention.

In a preferred embodiment of the present invention, shown in FIG. 4, the main office 330 can include additional features which facilitate data manipulation and utilization. Data enters the system from the intranet 400. Preferably, the directly connected remote offices would be part of the intranet 400 and data received from the internet 320, sent by the indirectly connected offices, would also enter the system at the intranet 400. The intranet 400 would preferably include at least one computer system designed to interface with the internet 320.

Data from the intranet 400 is sent to a standard interface 402 file. Preferably, Microsoft Excel is used as the standard interface 402. Data gathered from the internet 320 is sent to a web collection application 404. The preferred web data collection application 404 is Cold Fusion.

The data is then sent to a network data access application 406. The network data access application 406 acts as an interface between the network and the database 408. While many network to database interface applications are available, Oracle SQLNet is preferred.

The data then progresses from the network data access application 406 to the data base 408. The database 408 could be any data base, but an Oracle data base is preferred.

Applications 410 and 412 can be additional accessory programs that communicate with data base 408. Applications can include programs that upload data to the data base. For example, one of the applications 410 can be a smaller data base program that updates exchange rates, ownership information, and other miscellaneous data elements. The other application 412 can be a program that retrieves information from database 408, performs calculations and returns results back into database 408. For example, application 412 can calculate budget information by reading selected data elements from database 408, manipulating the data and returning a result. In another example, application 412 can also be used to enter marginal tax rates. In an exemplary embodiment of the invention, the calculations would be carried out in a manner similar to that shown in FIG. 6 as explained below.

The main office 330 can also include other components that may provide additional functions. Decision support software 414 communicates with database 408 can be used to analyze the data in database 408. Decision support software 414 can be used to analyze the data in many different ways. However, decision support software 414 preferably analyzes the data to provide forecasting and budgeting information. By providing this information, the decision support software 414 helps to make decisions about the future.

The main office 330 can generate reports 418 and can also include an ad-hoc query and reporting component 416. This component can be used to prepare customized reports and other documents. Some of the reports 418 generated in main office 330 can be customized reports.

Figure 5:
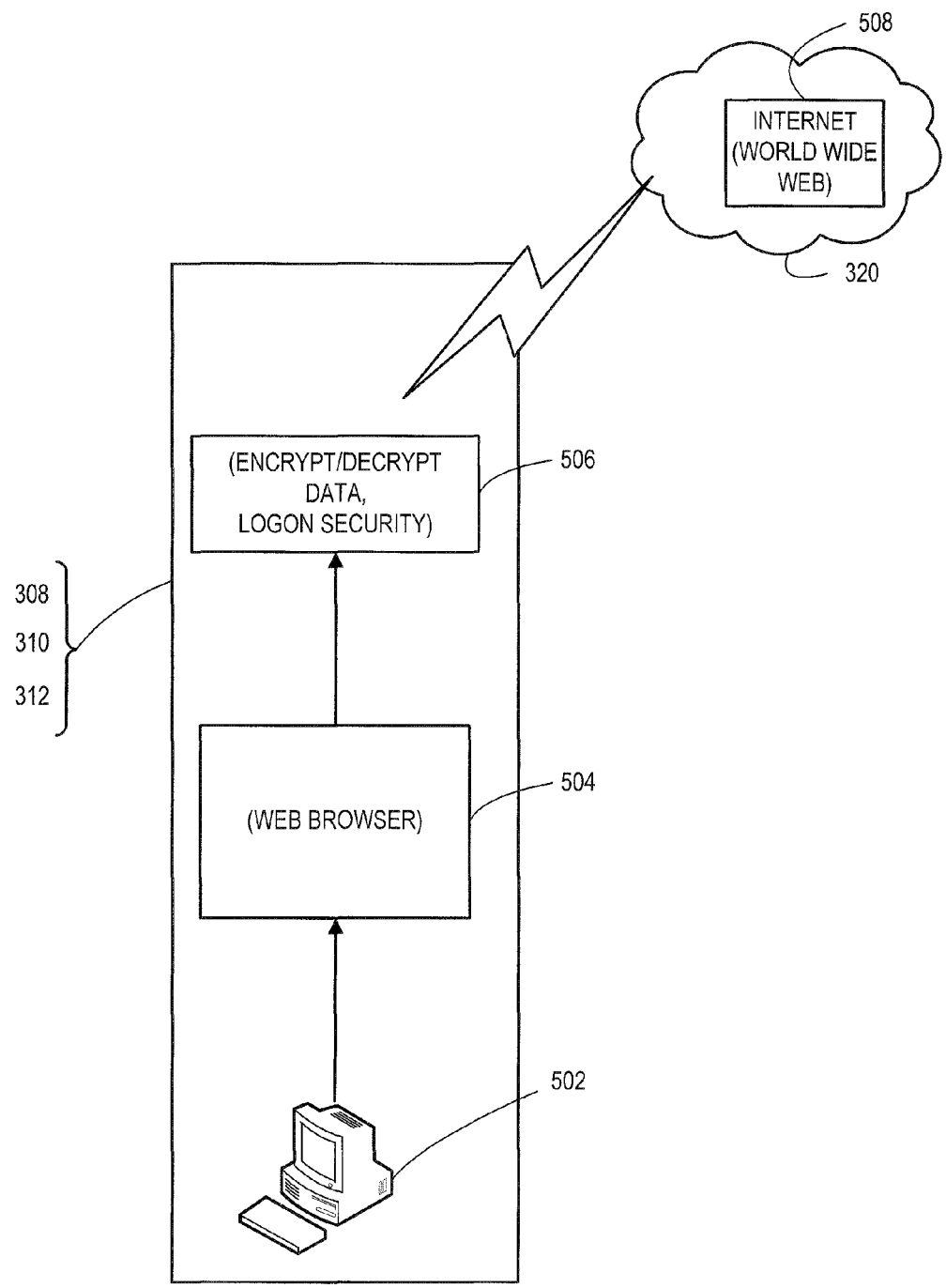
FIG. 5 is an enlarged view of a preferred embodiment of an indirectly connected office according to the invention.

FIG. 5 shows an enlarged view of a preferred embodiment of indirectly connected offices 308, 310, and 312. As stated before, there can be from zero to any desired number of indirectly connected offices. One or several of the indirectly connected offices could be configured in this manner.

Referring to FIGS. 3–5, the office can include a computer system 502 equipped with a web browser 504 and a security application 506. The computer system 502 can be used to communicate with the main office. The indirectly connected offices 308, 310, and 312 preferably communicate with the main office 330 over the internet 320.

The computer system 502 can be used to both retrieve data from the main office 330, and to send data to the main office 330. Preferably, all communications with the main office are conducted through a website 508. In an exemplary embodiment, the website 508 is a secure website.

Similar to the directly connected offices, when an indirectly connected office 308, 310, or 312 initiates contact with the main office 330, the main office 330 first responds to the contact with access rules and data rules. Because these indirectly connected offices communicate with the main office via a web site 508, the web site 508 preferably retrieves the access rules and the data rules from the main office 330 when an indirectly connected office 308, 310, or 312 enters the web site 508.

The web site 508, after having retrieved the access rules and the data rules, will determine if the contact is legitimate by comparing the login, password and security information with the access rules retrieved from the main office 330. If the contact is legitimate, the web site 508 will then provide a number of options. For example, the web site 508 can allow an indirectly connected office 308, 310, or 312 to access the main office's computer resources, including the data base 408 (see FIG. 4), upload information to the web site 508, or download information from the web site 508. The web site 508 could also be designed in a manner which would provide automatic or mandatory downloading of access rules and data rules to the indirectly connected offices 308, 310, or 312 as soon as the identity of the web site 508 visitor has been verified.

Once the indirectly connected offices 308, 310, or 312 have downloaded the access rules and data rules, those offices will then know the common or universal data formatting standards used by main office 330 (see FIG. 4). Preferably, the indirectly connected offices 308, 310, or 312 automatically integrate those standards into their operations and use those standards when entering data.

Remote users preferably use spreadsheet programs and may enter data into those spreadsheets. Preferably, both the spreadsheets and the fields contained in those spreadsheets use the standards downloaded from main office 330.

After the remote users have completed entering data into the spreadsheets, the remote users transmit or upload the spreadsheets to web site 508. Preferably, the spreadsheets are transmitted as flat files, i.e., files that contain just raw data. The flat files may be saved prior to transmission.

The transmitted spreadsheets are saved on a web server 404 after they have been received over the Internet. The data is then loaded onto the database 408 and the data rules are applied to the data. After the data has been successfully processed, a message is preferably sent to the remote office informing them that the data upload has been successful. Likewise, a failure message is preferably sent to the remote office in the event of an unsuccessful data upload. Preferably, the entire process of receiving data from web site 508 to loading data onto database 408 and returning appropriate messages is automated and requires little, if any, human intervention.

In addition to the data rules and the access rules which are centrally managed, the invention also includes provisions for centrally managing equations, functions, and other mathematical operators.

Figure 2:
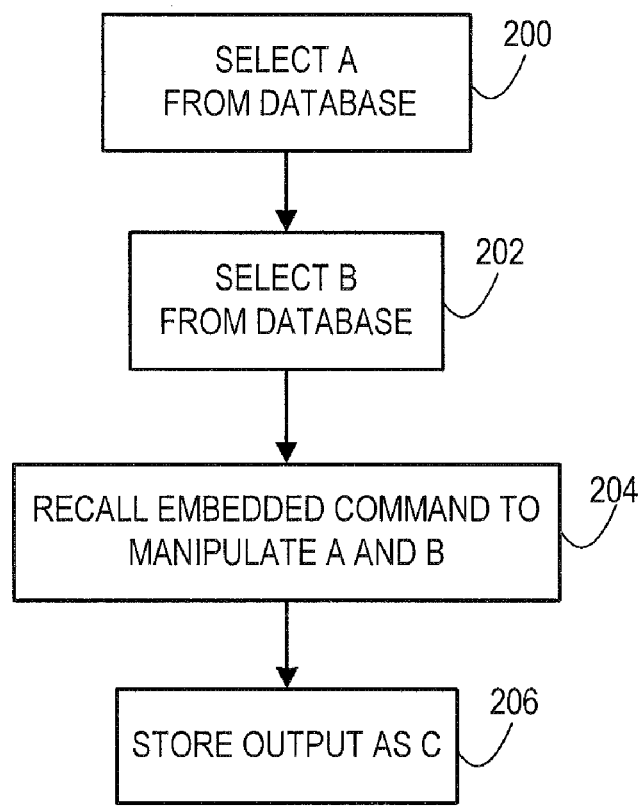
FIG. 2 is a prior art computing method.
Figure 6:
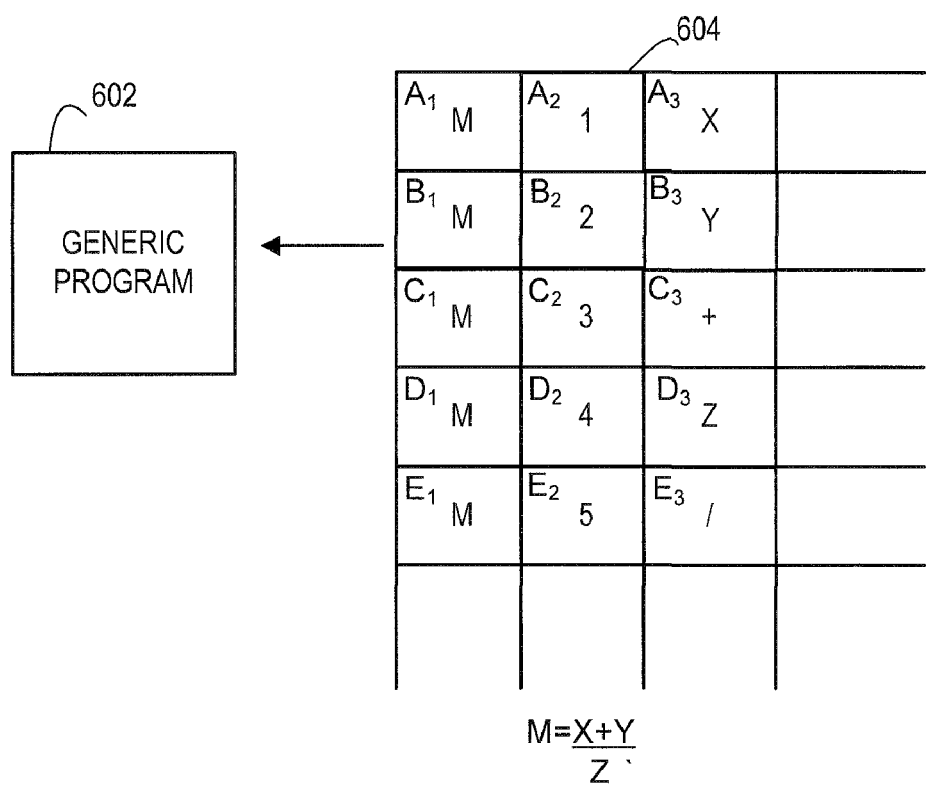
FIG. 6 is a schematic of a preferred embodiment of a computing method according to the invention.

Unlike the prior art, shown in FIG. 2, where the mathematical functions or commands are embedded within the spreadsheet program, the present invention instead places the equations and mathematical functions themselves in the data base along with the data. Preferably, as shown in FIG. 6, a generic program 602 retrieves data and functions from database 604. In an exemplary embodiment of the invention, the generic program operates in a Reverse Polish Notation (RPN) mode, as shown in the following example.

In FIG. 6, the generic program 602 retrieves data from database 604 which includes at least five rows and three columns. Of course, the database 604 could comprise fewer or more dimensions or fields to suit a particular application. The example shown in FIG. 6 has a first column that includes the name "M" of the function or calculation, and a second column that includes a step number. The third column includes data and instructions.

When the generic program 602 is ready to perform the operations of function M, it retrieves data from location A3. In the example shown in FIG. 6, the contents of location A3 is a number X. The generic program would then retrieve information from location B3, resulting in the retrieval of number Y. The program would then retrieve the addition operator from location C3. The generic program 602, which preferably operates in RPN would then add the numbers X and Y, from A3 and B3, respectively, to each other. The generic program 602 would then move to the contents of location D3 and the number Z would be read. As the generic program 602 reads the contents of location E3, the program would encounter an operator, in this case a division operator, and the generic program would know to divide the previous result with the number Z. After all of these steps, the mathematical expression is (X+Y)/Z has been computed by carefully designing database 604 and using the generic program 602.

The generic program 602 ends when no more items are found for the calculation of the function M. After the generic program 602 has completed calculation of the function M, the result is preferably stored in a suitable location in database 604.

In this way, complex mathematical expressions can be stored into a database as simple individual data elements and any generic program or application can solve the complex mathematical expression. This eliminates the need for complex mathematical expressions, or operations of any kind, to be programmed into applications programs, like spreadsheets. This also allows easy maintenance because, if changes to the mathematical expressions are ever needed, simple changes to the database can be made and there is no need to modify complex mathematical formulas embedded in another program, for example, in a spreadsheet.

Any of the various components disclosed can be used either alone or with other components or features of the invention.

It will be apparent to those skilled in the art that various modifications and variations can be made in the system and method for managing and controlling data of the present invention without departing from the spirit or scope of the invention.

The foregoing disclosure of embodiments of the present invention has been presented for purposes of illustration and description. It is not exhaustive or intended to limit the invention to the precise forms disclosed herein. Many variations and modifications of the embodiments described herein will be obvious to one of ordinary skill in the art in light of the above disclosure. The scope of the invention is to be defined only by the claims appended hereto, and by their equivalents.

What is claimed is:

1. A system for managing a set of access rules, comprising:

a main office retaining a set of access rules and a set of mathematical equations within a database where each equation is stored as a set of sequential steps within a dimension of the database where each step of the dimension is associated with one of a single variable and a single mathematical operator that is used in conjunction with variables and mathematical operators of previous steps to generate the equation, the main office in communication with at least one remote office to receive data and to apply the set of mathematical equations to the received data; and the remote office initiating contact with the main office and receiving the set of access rules from the main office after having initiated contact;

wherein the remote office communicates with the main office in conformity with the set of access rules received from the main office, wherein the set of access rules govern the transmission of data from the remote office to the main office, wherein for each type of data transfer from the remote office to the main office there is an access rule that comprises a single permissible formatting standard rule used by the main office for data transfers of that type, and wherein the formatting standard rule for the data transfer of that type is automatically sent to the remote office by the main office in response to the initiation of contact by the remote office and before the remote office sends entered data to the main office such that the entered data is first automatically correctly formatted to be compatible with the single permissible format used by the main office for the data transfer of that type.

2. The system for managing data according to claim 1, wherein one of the access rules includes a security access code.

3. The system for managing data according to claim 1, wherein one of the access rules includes a password.

4. The system for managing data according to claim 1, wherein one of the access rules includes verification of login identification.

5. The system for managing data according to claim 1, wherein one of the access rules limits the amount of information the remote office is permitted to access.

6. The system for managing data according to claim 1, wherein the main office further comprises at least one data rule.

7. The system for managing data according to claim 6, wherein one of the data rules includes a format for a field.

8. The system for managing data according to claim 6, wherein one of the data rules includes a specification for a number of fields.

9. The system for managing data according to claim 6, further comprising a plurality of remote offices that receive the set of access rules and that transfer data to the main office in conformity with the set of access rules.

* * * * *